United States Patent [19]

Bell

[11] Patent Number: 4,834,011

[45] Date of Patent: May 30, 1989

[54] AIR CUSHION VEHICLE STERN SEAL

[75] Inventor: James C. Bell, New Orleans, La.

[73] Assignee: The United States of America as represented by the Secretary of the Navy, Washington, D.C.

[21] Appl. No.: 244,582

[22] Filed: Sep. 13, 1988

Related U.S. Application Data

[63] Continuation of Ser. No. 29,157, Mar. 23, 1987, abandoned.

[51] Int. Cl.$^4$ .............................. B63B 1/34; B60V 1/16
[52] U.S. Cl. ................................... 114/67 A; 180/124; 180/126
[58] Field of Search .............. 114/67 A; 180/116–129; 244/100 A

[56] References Cited

U.S. PATENT DOCUMENTS

| | | | |
|---|---|---|---|
| 3,443,659 | 5/1969 | Moore | 180/121 |
| 3,561,560 | 2/1971 | Ford | 180/126 X |
| 3,756,343 | 9/1973 | Joyce, Jr. | 180/127 |
| 3,782,494 | 1/1974 | Simpson | 180/124 |
| 3,783,965 | 1/1974 | Wright | 180/128 |
| 3,863,732 | 2/1975 | Crewe | 180/128 X |
| 3,987,865 | 10/1976 | Krupp | 180/127 |
| 4,077,589 | 3/1978 | Belolipetsky et al. | 244/100 A X |
| 4,131,175 | 12/1978 | Wheeler | 180/127 |
| 4,469,334 | 9/1984 | LeComte | 277/12 |
| 4,494,473 | 1/1985 | Simpson | 114/67 A |
| 4,658,926 | 4/1987 | Paradis, IV | 180/126 |

*Primary Examiner*—Sherman D. Basinger
*Assistant Examiner*—Paul E. Salmon
*Attorney, Agent, or Firm*—Bean, Kauffman & Spencer

[57] ABSTRACT

There is disclosed an improved stern seal construction for air cushion supported operating type marine vessels which consists of an array of inflatable, vertically oriented inverted truncated open-ended cones or fingers. These fingers are individually attached to and mounted to depend in side-by-side relation from the bottom of an inflatable bag which in turn is mounted upon and extends transversely across and below the bottom of the stern end of the vessel's hull. The fingers are arranged in side-by-side pressed together relationship, and thus assume in horizontal section generally rectangular forms. In side view sectional profile the finger and bag contours are so balanced that a minimum load at the bottom ends of the fingers will permit them to raise to allow for passages over rough objects. The front or leading panels of the fingers are stiffened somewhat toward their bottom ends, and are extended under the open bottoms of the fingers beyond their trailing panel portions. Thus, the extended portions normally close off the bottom of each finger in the manner of a flap valve, preventing water or other terrain material from entering the bottom of the finger such as would otherwise permit undesirable "scooping" thereof into the air cushion stern seal system. Furthermore, the fingers are preferably tapered in rear view at their bottom ends so as to provide for each finger an improved inflated shape stability performance when the ship is operating over a terrain surface which intermittently "falls away" from the bottoms of the fingers.

8 Claims, 1 Drawing Sheet

AIR CUSHION VEHICLE STERN SEAL

This application is a continuation of application Ser. No. 029,157, filed 03/23/87, now abandoned.

BACKGROUND AND OBJECTS OF THE INVENTION

This invention relates to air cushion supported vehicles of the type such as are referred to as ACVs and/or "surface effect ships" (SESs); and more specifically to improvements in respect to the design of the stern air cushion seal systems therefor. Such vessels typically comprise a main hull or platform which when traveling is buoyantly supported above the terrain by a cushion of air. In the case of surface effect ships, the air cushions are confined under the hulls by means of rigid side hulls and flexible bow and stern seals. In the case of other air cushion vehicles (ACVs), inflatable trunk and/or finger or cone arrangements are employed in lieu of rigid side hulls. In any case, the stern seal systems thereof confront critical performance capability problems in order to provide efficient cost effective operations of the vehicle by way of maintaining a suitably high under hull cushion pressure, while at the same time passing over waves or solid objects while avoiding high drag or excessive air cushion pressure leakage problems or combinations of both. Prior type stern seal constructions for combating this problem are disclosed for example in U.S. Pat. Nos. 3,260,323; 3,297,102; 3,372,664; 3,420,330; 3,443,659; 3,756,343; 3,907,061; 4,469,334 and 4,494,473.

It is a primary object of the present invention to provide a stern seal construction which is operative to perform its designated function with improved efficiency, along with improved ability to avoid wear and tear upon its component parts during high speed operations over rough water or other terrain so as to require substantially lesser maintenance servicing. Furthermore, the invention provides for improved operational stability performances of such vehicles when planing over rough surfaces.

BRIEF SUMMARY OF THE INVENTION

The stern seal of the present invention consists of an array of inflatable, vertically oriented inverted truncated open-ended cones or fingers, which are individually mounted to depend in side-by-side relation from the bottom of an inflatable bag which is in turn mounted upon and extends transversely across and below the bottom of the stern end of the vessel's hull. The fingers are arranged in a side-by-side serial arrangement and when inflated are pressed together so as to assume in horizontal section generally rectangular forms. In side view sectional profile the finger and bag contours are so balanced that a minimum load at the bottom ends of the fingers will permit them to raise to allow for passages over rough objects. The front or leading panels of the fingers are stiffened somewhat toward their bottom ends, and are extended under the open bottoms of the fingers beyond their trailing panel portions. Thus, the extended portions normally close off the bottom of each finger in the manner of a flap valve, preventing water or other terrain material from entering the bottom of the finger such as would otherwise permit undersirable "scooping" thereof into the air cushion stern seal system. However, the flap primarily function to normally maintain the fingers in inflated condition while they plane over the terrain.

This open bottom construction of the fingers allows them to contact and flexibly respond to irregular surfaces while minimizing the drag effects of the seal system on the ship propulsion system. This is because the fingers are allowed to rise above the flap and discharge air immediately upon impact thereon, following which the flaps again close and the fingers reinflate so that they follow the terrain surface at their bottom ends, thereby constantly maintaining an efficient air cushion pressure seal. Furthermore, the fingers are preferably tapered when in rear view at their bottom ends so as to provide for each fingers an improved inflated shape stability performance when the ship is operating over a terrain surface which intermittently "falls away" from the bottom of the fingers.

THE DRAWINGS

FIG. 1 of the accompanying drawing is a rear end elevational view of a SES employing a preferred form of stern seal construction of the present invention;

DETAILED SPECIFICATION

Figure 1:
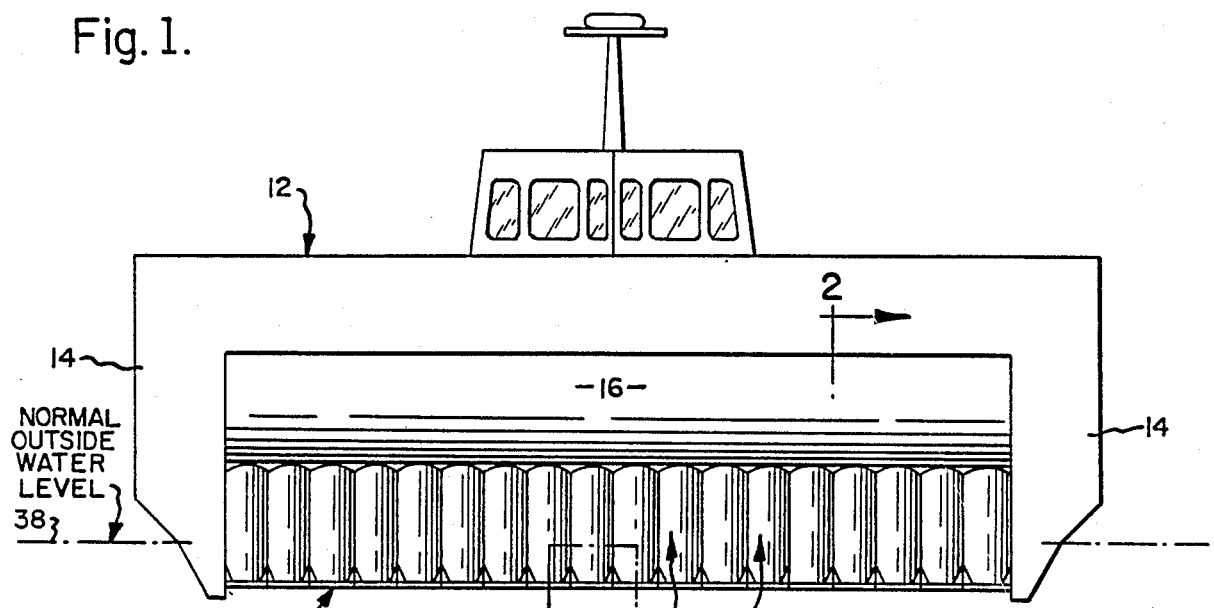

As shown by way of example in the drawing herewith, the invention is embodied in an otherwise conventional type surface effect ship having a main hull or platform 12 which buoyantly supports the ship relative to a body of water when "off-cushion". Opposite sidehulls 14,14 extend downwardly from the main hull 12 to enable the ship to operationally ride substantially higher above the water by means of a cushion of air under the main hull. For this purpose, the sidehulls are bridged at the bow end of the ship by means of a flexible bow seal device (forming no part of the present invention) and at the stern end of the ship by means of a seal system of the present invention. Thus, the space beneath the ship platform 12 and between the sidehulls 14,14 and the bow and stern seals is adapted to confine a cushion of air for raising the ship to a water-skimming elevation upon supply of compressed air to the bow and stern seals and to the air cushion chamber as by means of blowers or the like, as is well known in the art.

Figure 2:
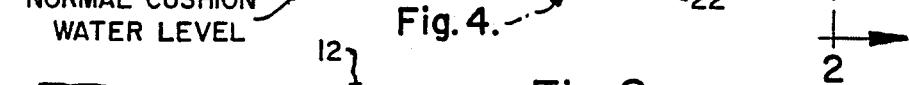
FIG. 2 is a fragmentary sectional view on enlarged scale taken as along line 2—2 of FIG. 1, showing how the cone elements of the stern seal construction of FIG. 1 are mounted in a SES as a portion of the stern seal assembly thereof.
Figure 2:
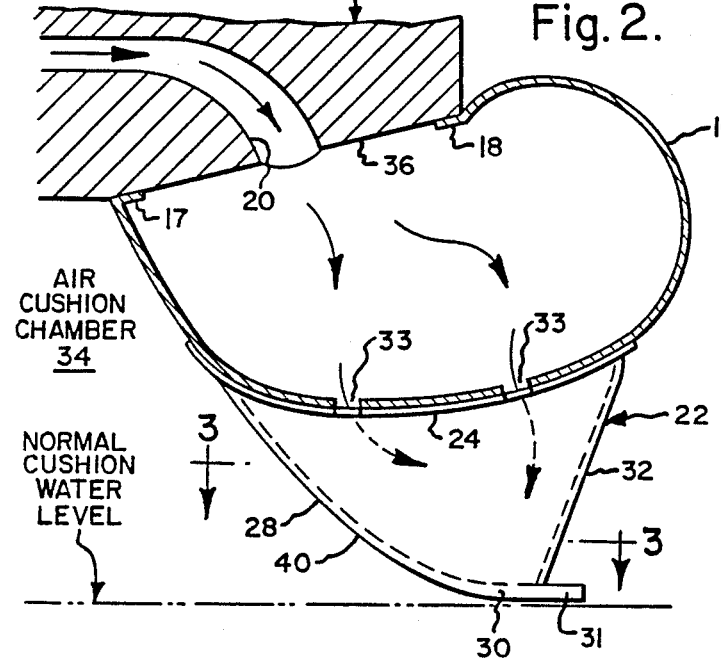
Figure 3:
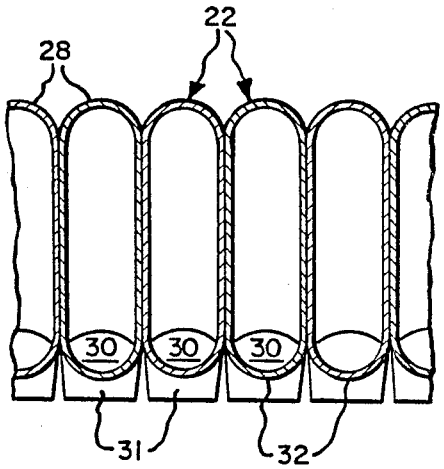
FIG. 3 is a further enlarged scale fragmentary sectional view taken as along line 3—3 of FIG. 1.

As best shown at FIG. 2, the stern seal consists of an inflatable bag 16 which extends transversely between the sidehulls 14,14 beneath the rear end of the main hull structure 12. The bag 16 is of open top form and is attached to the main hull such as by means of flange portions 17,18; and is thus arranged to be inflated by means of compressed air via an air duct 20 or the like leading from an air compressor (not shown) carried by the hull of the ship, as is also well known in the art. A plurality or inflatable vertically oriented open top and bottom fingers 22 are individually carried to extend in downwardly swept back attitude from the bag 16 in side-by-side pressed together relation, when inflated as best shown in FIGS. 1 and 3. The bag 16 and the fingers 22 are manufactured from flexible sheet material such as for example rubber or other elastomeric material impregnated nylon cloth, or the like; and the fingers are adhesively or mechanically fastened to the bag at upper end edge portions 24 thereof.

The fingers 22 are initially of inverted, truncated, open-ended cone-like configurations, and are mounted below the bag in side-by-side linear relation so that when inflated they assume side-by-side pressed together generally rectangular horizontal sectional shapes as shown at FIG. 3. The front ambiently exposed panel portion 28 of each finger declines downwardly and rearwardly from the bag 16 and the rear panel portion thereof stands in forwardly declining attitude (FIG. 2) so as to rigidize the finger against crumpling when impacting against waves passing under the ship. The front or "leading" panel portion 28 of each finger is also extended and folded to lie as shown at 30 (FIGS. 2,3) below the open bottom thereof to provide a water-planing plate, and is further extended terminating as shown at 31 slightly beyond the rear ambiently exposed panel portion 32 of the finger. The bottom portion of the bag 16 is apertured in communication with each finger such as is shown at 33 (FIG. 2), to permit compressed air to move from the interior of the bag 16 into the fingers so as to inflate them into configurations as illustrated. Thus, as shown at FIG. 2, the stern seal construction is operable to substantially air seal the cushion space 34 under the vehicle hull at the stern end of the vessel.

Preferably, the bottom surface of the main hull is vertically inclined at its stern end as shown at 36 in FIG. 2; and the bag 16 is configured so that when inflated a substantial portion thereof extends rearwardly beyond the rear end of the hull. Thus, as the ship tranverses a typical open water surface such as is indicated at 38 (FIG. 1) the stern seal construction closes off the rear end of the air cushion space under the ship while the flap portions 30 to the fingers 22 plane over the surface of the water. When the fingers 22 encounter waves, they oscillate in accordance therewith, and the bag 16 variously deforms to permit the fingers to deflect rearwardly and upwardly and then back downwardly and forwardly, so as to follow the contours of the waves. As the fingers deflect rearwardly and upwardly, the flaps 30 are free to move slightly away from the open bottoms of the fingers, thereby relieving the wave-induced pressure impacts on the seal system. However, upon passage of the wave, the resiliency characteristic of the bag 16 operates to cause the fingers to return into the trough ahead of the next wave, whereupon the flaps close the bottom ends of the fingers thereby maintaining the stern seal effect while experiencing only minimal cushion air lost effect.

Figure 4:
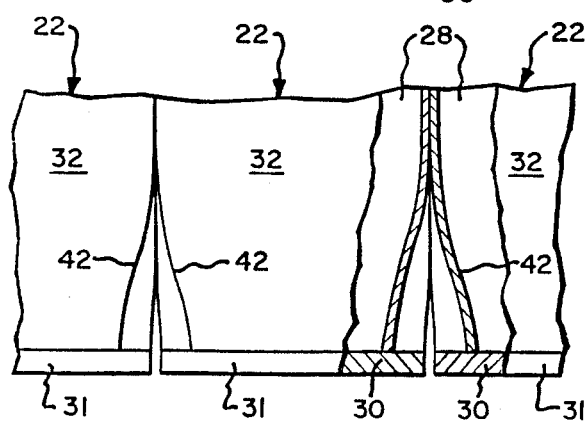
FIG. 4 is an enlarged scale fragmentary rear elevational view of that portion of the stern seal construction that is outlined at "FIG. 4" of FIG. 1.

The lower portions 40 of the front panels 28, and the flap portions 30 of the fingers 22 are preferably of increased thickness and stiffness in order to better withstand the buffeting impacts of waves thereon, as is best shown at FIG. 2. Also, the fingers 22 are tapered in rear view as shown at 42 (FIG. 4) to provide improved inflated shape stabilities for each finger, particularly when the water surface "falls away" from the bottoms of the fingers.

Whereas the detailed description hereinabove relates specifically to the operation of a stern system of the present invention when employed in a SES type vessel, the invention is equally applicable to stern seals for other type ACVs operating over all kinds of terrain; and in any case, this stern seal is efficient while generating much lower drag effects against forward movement when operating at all speeds and over all kinds of terrain surfaces. Furthermore, this seal construction is of low initial cost and has demonstrated a more than 10 to 1 improvement in durability over performances of typical prior art constructions for similar purposes.

What is claimed is:
1. In an air cushion supported vessel of the surface effect ship type having a main hull and opposite side hulls, an improved stern seal system including an inflatable bag depending from said main hull and extending between said side hulls, and a plurality of inflatable fingers having open top and bottom end portions attached at their open top end portions to and depending from said bag and arranged in vertically swept back side by side standing relation linearly between said side hulls; said bag having apertures leading into each of said fingers; and a compressed air supply facility carried by said main hull for supplying compressed air to said bag, whereby when said bag and said fingers are inflated said fingers are sidewise pressed together and assume sectional configurations comprising consecutively contiguous relatively slidable flattened side wall portions and embiently exposed front and rear wall portions, the improvement comprising:
said fingers being shaped so that when they are inflated, said front wall portions thereof incline downwardly and rearwardly from said bag and said rear wall portions thereof incline downwardly and forwardly from said bag; and
a water-planing bottom plate means hingedly extends from the front wall portion of each of said fingers and rearwardly therefrom under the open bottom end portions of said fingers beyond the rear wall portions thereof.
2. A stern seal system as set forth in claim 1 wherein said fingers are fabricated of flexible sheet material, and said bottom plate means comprise integral continuations of the sheet material forming the front wall portions of said fingers.
3. A stern seal system as set forth in claim 2 wherein said bottom end portions of said front wall portions are of constantly increasing thickness and stiffness from said top end portions thereof to said bottom end portions thereof.
4. A stern seal system as set forth in claim 3 wherein said bottom plate means are narrowed in plan view so as to avoid interfering with relative sliding motions of contiguous fingers when inflated, and are of such widths as to extend peripherally beyond said bottom end portions of said front and rear and side wall portions of said fingers.
5. A stern seal system as set forth in claim 2 wherein said bottom end portions of said front wall portions are thicker and stiffer than said side and rear and said top end portions of said front wall portions.
6. A stern seal system as set forth in claim 2 wherein said bottom plate means are thicker and stiffer than said top end portions of said front wall portions and said side and rear wall portions of said fingers.
7. A stern seal system as set forth in claim 2 wherein the lower ends of the side wall portions of each of said fingers taper away from the side wall portions of the fingers adjacent thereto.
8. A stern seal system as set forth in claim 1 wherein the lower ends of said side wall portions of each of said fingers taper away from the side wall portions of the fingers adjacent thereto.

* * * * *